(12) United States Patent
Liu et al.

(10) Patent No.: US 6,487,035 B1
(45) Date of Patent: Nov. 26, 2002

(54) METHOD AND APPARATUS FOR ADAPTIVE FEEDFORWARD CANCELLATION

(75) Inventors: Xiong Liu, Singapore (SG); Joseph C. Liu, Singapore (SG); Kevin A. Gomez, Singapore (SG); Mingzhong Ding, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/467,989

(22) Filed: Dec. 20, 1999

Related U.S. Application Data (60) Provisional application No. 60/116,071, filed on Jan. 15, 1999.

(51) Int. Cl.[7] ............................................. G11B 5/596
(52) U.S. Cl. .................................. 360/77.04; 360/77.08
(58) Field of Search ........................ 360/77.08, 77.04, 360/77.02, 77.06, 78.05, 78.06, 78.09, 78.11; 369/43, 44.34, 44.29, 44.35

(56) References Cited

U.S. PATENT DOCUMENTS

| | | | |
|---|---|---|---|
| 4,135,217 A | 1/1979 | Jacuques et al. | 360/77 |
| 4,536,809 A | 8/1985 | Sidman | 360/77 |
| 4,616,276 A | 10/1986 | Workman | 360/77 |
| 5,402,280 A | 3/1995 | Supino | 360/77.04 |
| 5,404,253 A | 4/1995 | Painter | 360/77.04 |
| 5,550,685 A * | 8/1996 | Drouin | 360/77.04 |
| 5,585,976 A | 12/1996 | Pham | 360/77.04 |
| 5,592,346 A | 1/1997 | Sullivan | 360/77.04 |
| 5,602,689 A | 2/1997 | Kadlec et al. | 360/78.04 |
| 5,615,065 A | 3/1997 | Cheung | |
| 5,774,299 A * | 6/1998 | Baum et al. | 360/77.02 |
| 5,854,722 A | 12/1998 | Cunnigham et al. | 360/77.04 |
| 5,875,066 A | 2/1999 | Ottesen | 360/77.11 |
| 5,923,491 A * | 7/1999 | Kisaka et al. | 360/53 |

FOREIGN PATENT DOCUMENTS

JP 07098948 A * 4/1995

* cited by examiner

*Primary Examiner*—Thang V. Tran
(74) *Attorney, Agent, or Firm*—Theodore M. Magee; Westman, Champlin & Kelly, P.A.

(57) ABSTRACT

A method and apparatus are provided for generating an adaptive feedforward cancellation signal for a next sector of a disc in a disc drive. The cancellation signal includes at least one tap weight multiplied by at least one trigonometric function. To form the cancellation signal, the method and apparatus first determine a servo loop transfer function relative to a feedforward cancellation component in the disc drive. The transfer function is then inverted to form filter parameters. A position error value is then measured for a current signal and is passed through a filter formed from the filter parameters. This creates a filtered position error value that is used with the tap weights of a current sector to determine the tap weights for the cancellation signal of the next sector.

15 Claims, 9 Drawing Sheets

METHOD AND APPARATUS FOR ADAPTIVE FEEDFORWARD CANCELLATION

REFERENCE TO RELATED APPLICATIONS

The present application claims priority from a U.S. Provisional Patent Application having serial No. 60/116,071 filed on Jan. 15, 1999 and entitled IMPROVED ADAPTIVE FEEDFORWARD CANCELLATION.

FIELD OF THE INVENTION

The present invention is related to disc drives. In particular, the present invention is related to repeatable runout compensation.

BACKGROUND OF THE INVENTION

In a computer disc drive, data is stored on a computer disc in concentric tracks. In disc drives with relatively high track densities, a servo feedback loop is used to maintain a head over the desired track during read or write operations. This is accomplished by utilizing prerecorded servo information either on a dedicated servo disc or on angularly spaced sectors that are interspersed among the data on a disc. During track following, the servo information sensed by the head is demodulated to generate a position error signal (PES), which provides an indication of the position error of the head away from the track center. The PES is then converted into an actuator control signal, which is fed back to control an actuator that positions the head.

In general, there are two forms of head positioning errors: repeatable and non-repeatable. Non-repeatable errors are generally unpredictable and therefore can not be removed until after they occur. Repeatable errors, which are generally caused by mechanical irregularities in the structure of the disc drive or errors introduced when writing the servo tracks, can be predicted and therefore theoretically can be cancelled out as they occur. In general, these repeatable runout errors (RRO) are removed by introducing a compensation signal into the servo loop that cancels the repeatable positioning error. Techniques for generating such compensation signals are generally referred to as feedforward cancellation.

Because the feedforward cancellation signal is introduced into the servo loop, it can cause the servo loop to become unstable under certain conditions. In particular, if the cancellation signal is too large for a given Position Error Signal, the cancellation signal can cause the head to oscillate across the track center line, thereby keeping the head from reaching a steady state position over the track.

To avoid this problem, the prior art has developed adaptive feedforward cancellation. An example of adaptive feedforward cancellation is shown in Workman (U.S. Pat. No. 4,616,276). Under adaptive feedforward cancellation, the cancellation signal is initially set to zero. The position error signal is then measured at a first sector and is used to set the amplitude of the cancellation signal for the next sector. To avoid instability, the position error signal is multiplied by a learning rate, which is between zero and one. Under some systems, the learning rate is reduced at each successive sector to further ensure stability while improving the likelihood that the cancellation signal will fully cancel the repeatable runout error.

One problem with current adaptive feedforward cancellation techniques is that the learning rate must be set very low in order to ensure stability in all disc drives. As a result, the cancellation signal takes much longer to train, especially for higher harmonics. In fact, for some disc drives, the cancellation signal never reaches a value that completely cancels the repeatable runout error at some harmonics.

SUMMARY OF THE INVENTION

A method and apparatus are provided for generating an adaptive feedforward cancellation signal for a next sector of a disc in a disc drive. The cancellation signal includes at least one tap weight multiplied by at least one trigonometric function. To form the cancellation signal, the method and apparatus first determine a servo loop transfer function relative to a feedforward cancellation component in the disc drive. The transfer function is then inverted to form filter parameters. A position error value is then measured for a current signal and is passed through a filter formed from the filter parameters. This creates a filtered position error value that is used with the tap weights of a current sector to determine the tap weights for the cancellation signal of the next sector.

DETAILED DESCRIPTION

Figure 1:
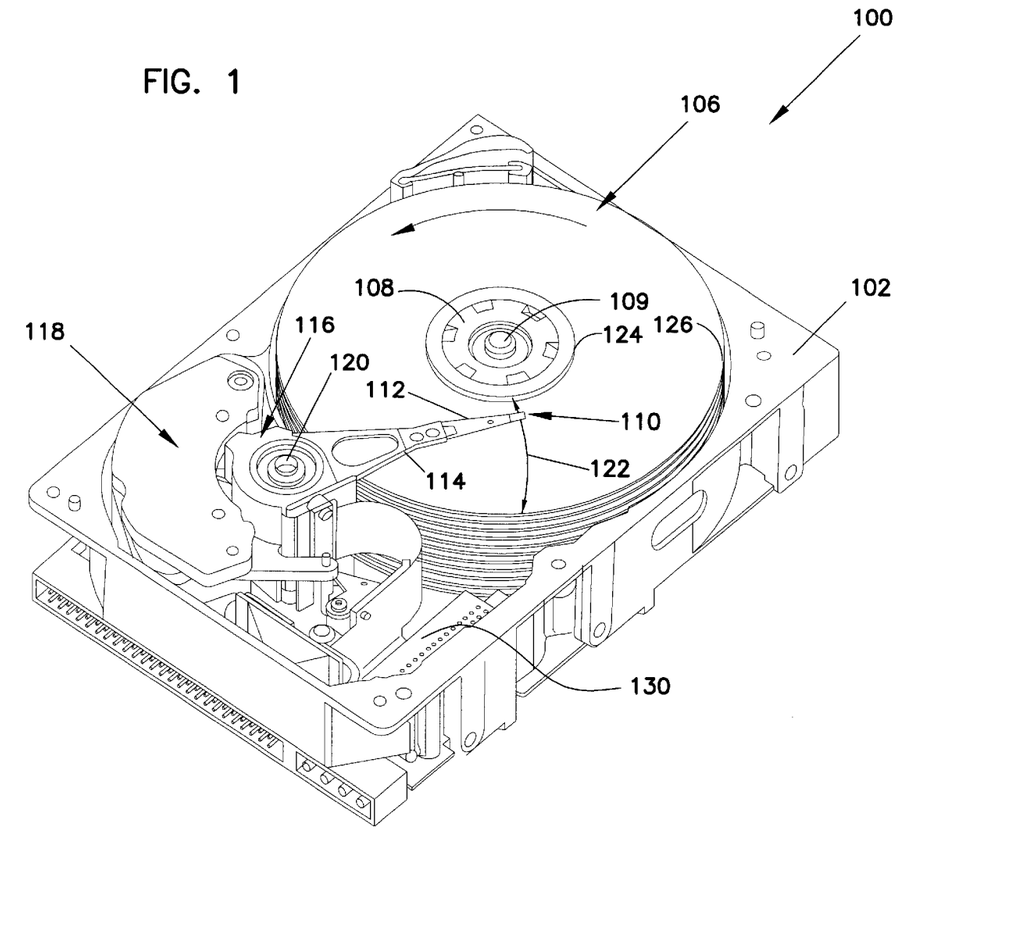
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
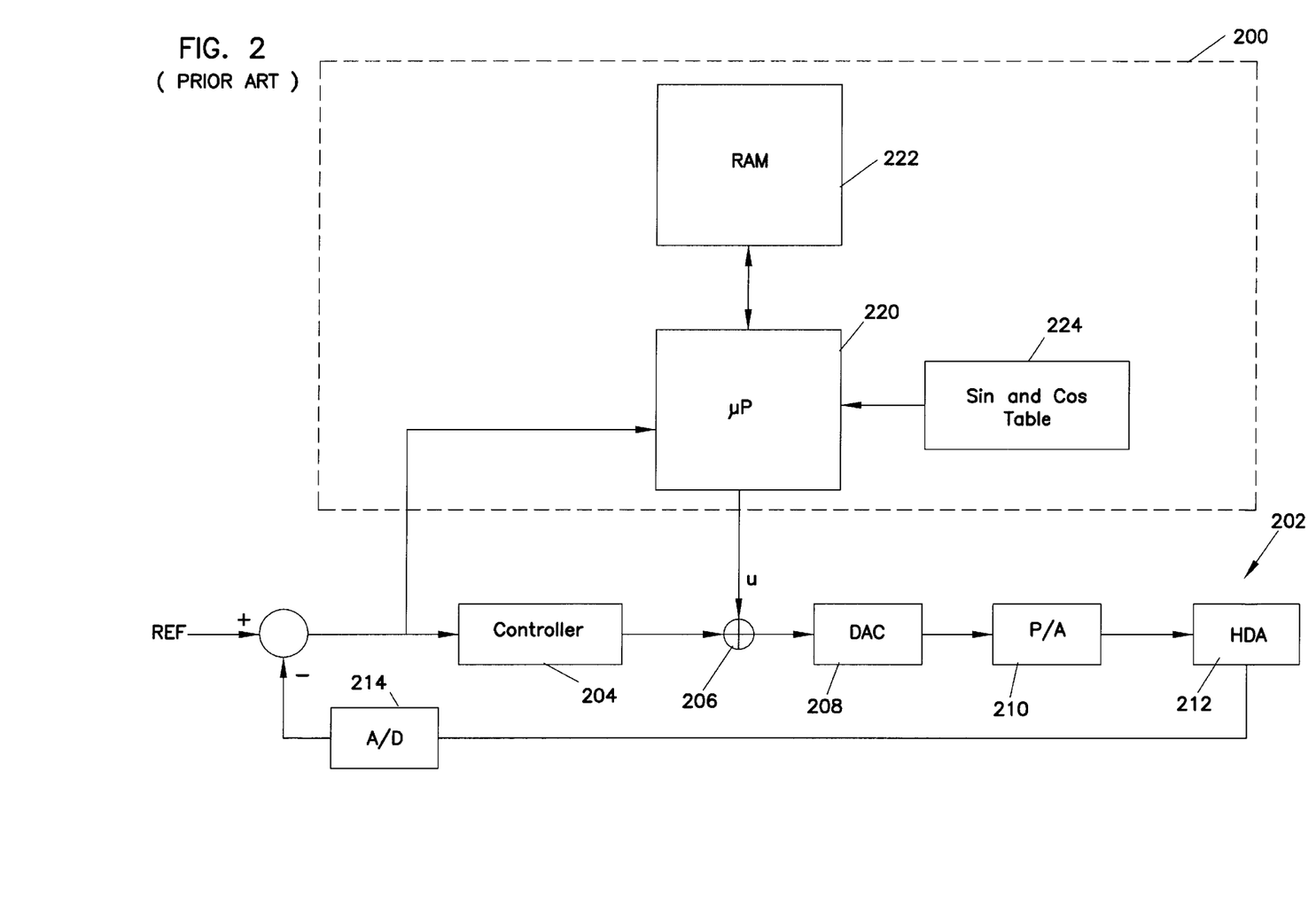
FIG. 2 is a prior art servo loop with an adaptive feedforward cancellation system.

FIG. 2 is a block diagram of a prior art feedforward cancellation system 200 in a servo loop 202 that is found in some servo electronics 130 of the prior art. Because the precise structure of the servo loop is not significant to the present invention, servo loop 202 is shown in a simplified form. Those skilled in the art will appreciate that servo loops are more complex than the simple diagram of FIG. 2.

In FIG. 2, servo loop 202 includes a servo controller 204 that receives a reference signal (REF) indicating the desired position for a head on the disc. Based on the reference signal, digital controller 204 generates a digital control value that passes through a cancellation summing node 206 (described further below) and into digital-to-analog converter 208. The digital control value is converted into an analog current by digital-to-analog converter 208 and the analog current is amplified by a power amplifier 210 to produce an actuator control current. The actuator control current is provided to a voice coil motor in a head-disc assembly (HDA) 212 and causes the voice coil motor to move based on the magnitude and polarity of the current. As the voice coil motor moves, head-gimbal assemblies attached to the voice coil motor move across the disc thereby changing the positions of the heads relative to tracks on the disc.

Using servo patterns stored on the disc, a head generates an analog signal that indicates the distance from the head to the track center. The analog signal is provided to an analog-to-digital converter 214, which forms a digital signal from the analog signal. The digital signal is then combined with the reference signal to produce a position error signal (PES) that is fed back to controller 204. Controller 204 uses the position error signal to generate a new digital control value. In particular, controller 204 generates a digital value designed to bring the heads toward the desired track position.

Figure 3:
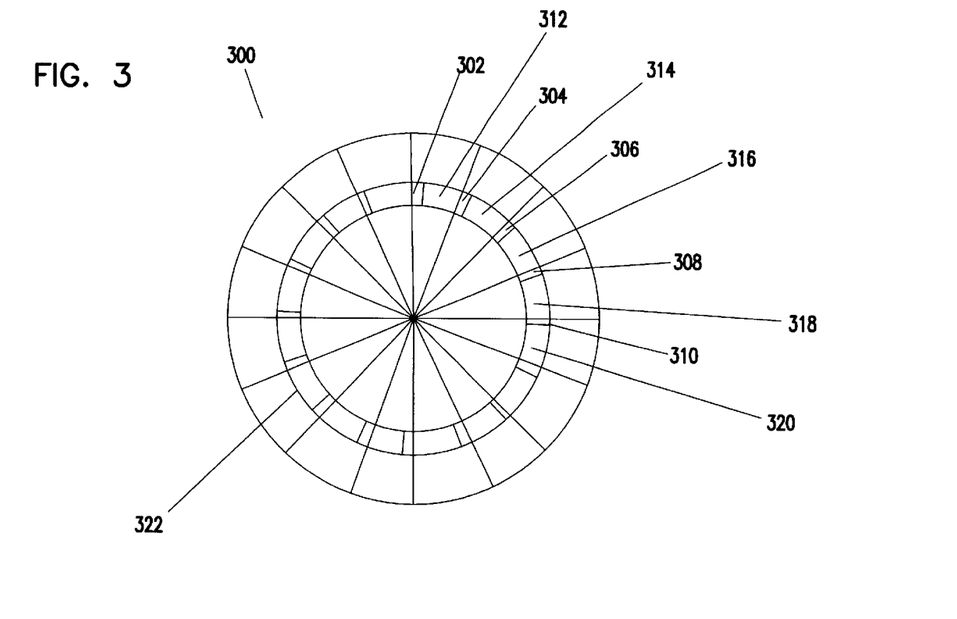
FIG. 3 is a top view of a disc showing a sector layout used in the present invention.

In embedded servo systems, the servo information is stored in sectors along the data track. FIG. 3 provides a top view of a disc 300 showing servo sectors 302, 304, 306, 308, and 310 interspersed among data fields 312, 314, 316, 318, and 320 along a track 322. Note that FIG. 3 is not drawn to scale and that most discs have many more servo fields. For example, in one embodiment of the present invention, there are 120 servo fields per track.

Figure 4:
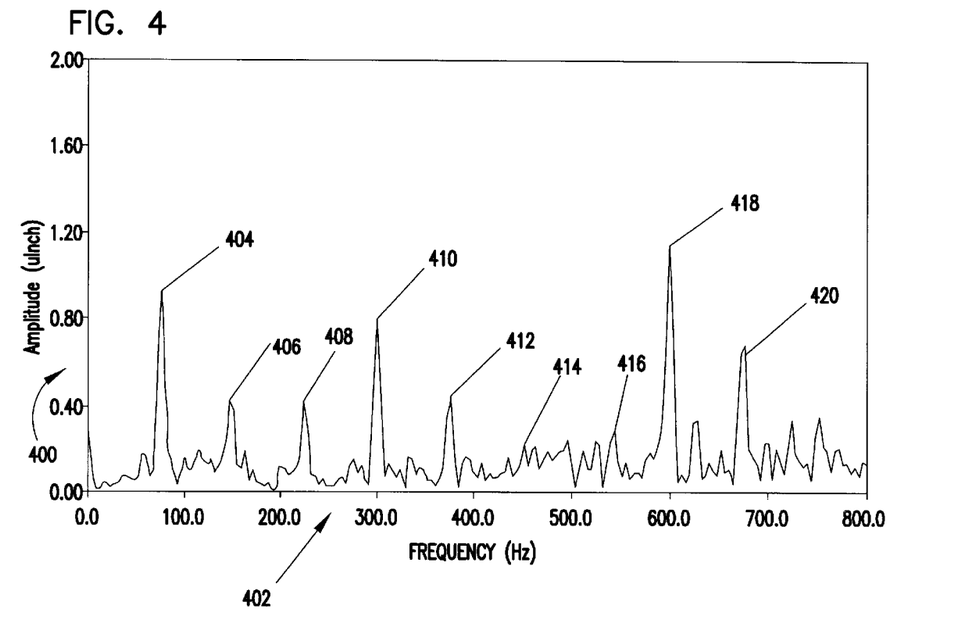
FIG. 4 is a frequency spectrum of a position error signal.

Repeatable runout errors can be seen by examining the frequency spectrum of the position error signal measured over several rotations of the disc. An example of such a spectrum is shown in FIG. 4, where the amplitude of the position error signal is shown in microinches along vertical axis 400 and frequency is shown along horizontal axis 402. In FIG. 4, the repeatable runout errors appear as peaks 404, 406, 408, 410, 412, 414, 416, 418, and 420 in the spectrum. These peaks occur at the harmonics of the fundamental sector frequency, which is defined as $2\pi/N$ where N is the number of sectors in one revolution of the disc.

As discussed above, the prior art developed adaptive feedforward cancellation to cancel the repeatable runout error. Adaptive feedforward cancellation generates a correction value at each sector that is added to the servo loop. In general, this correction value is calculated as:

$$U(k) = W_1(k)X_1(k) + W_2(k)X_2(k) \qquad \text{EQ. 1}$$

where $W_1(k)$ and $W_2(k)$ are tap weights and $X_1(k)$ and $X_2(k)$ are the values of sine and cosine functions at sector k, which are defined as:

$$X_1(k) = \sin\left[k\left(\frac{2\pi}{N}\right)\right] \qquad \text{EQ. 2}$$

$$X_2(k) = \cos\left[k\left(\frac{2\pi}{N}\right)\right] \qquad \text{EQ. 3}$$

where N is the number of sectors in one revolution of the disc.

Under adaptive feedforward cancellation, each tap weight is a function of the tap weight of the previous sector and the measured position error signal of the previous sector. Specifically, in the prior art, the tap weights are defined as:

$$W_1(k+1) = W_1(k) + C(k) \cdot PES(k) \cdot X_1(k) \qquad \text{EQ. 4}$$

$$W_2(k+1) = W_2(k) + C(k) \cdot PES(k) \cdot X_2(k) \qquad \text{EQ. 5}$$

where $C(k)$ is a learning rate and $PES(k)$ is the position error signal for the kth sector.

In Equation 1 above, only the fundamental frequency is cancelled by the cancellation value. However, Equation 1 can be expanded so that the cancellation value includes the harmonics of the fundamental frequency. Specifically, a sine and cosine term is added for each harmonic. This results in the generalized equation:

$$U(k) = \sum_{i=1}^{m} W_{i,k}^{\sin} X_{i,\sin}(k) + W_{i,k}^{\cos} X_{i,\cos}(k) \qquad \text{EQ. 6}$$

where:

$$X_{i,\sin}(k) = \sin\left[i \cdot k\left(\frac{2\pi}{N}\right)\right] \qquad \text{EQ. 7}$$

$$X_{i,\cos}(k) = \cos\left[i \cdot k\left(\frac{2\pi}{N}\right)\right] \qquad \text{EQ. 8}$$

and $$W_{i,j+1}^{\sin} = W_{i,k}^{\sin} + C(k) \cdot PES(k) \cdot X_{i,\sin}(k) \qquad \text{EQ. 9}$$

$$W_{i,k+1}^{\cos} = W_{i,k}^{\cos} + C(k) \cdot PES(k) \cdot X_{i,\cos}(k) \qquad \text{EQ. 10}$$

In FIG. 2, the adaptive feedforward cancellation system 200 implements equations 6 through 10 using a microprocessor 220, a random access memory 222, and a sine and cosine table 224. Specifically, microprocessor 220 generates a set of new tap weights using the tap weights for the previous sector and the position error signal for the previous sector, which is taken from analog-to-digital converter 214. Microprocessor 220 multiplies the position error signal by the learning rate, which is stored in random access memory 222 and a sine or cosine function for the previous sector stored in sine and cosine table 224. Microprocessor 220 then multiplies each new tap weight by a respective sine or cosine value for the current sector stored in sine and cosine table 224.

Figure 5:
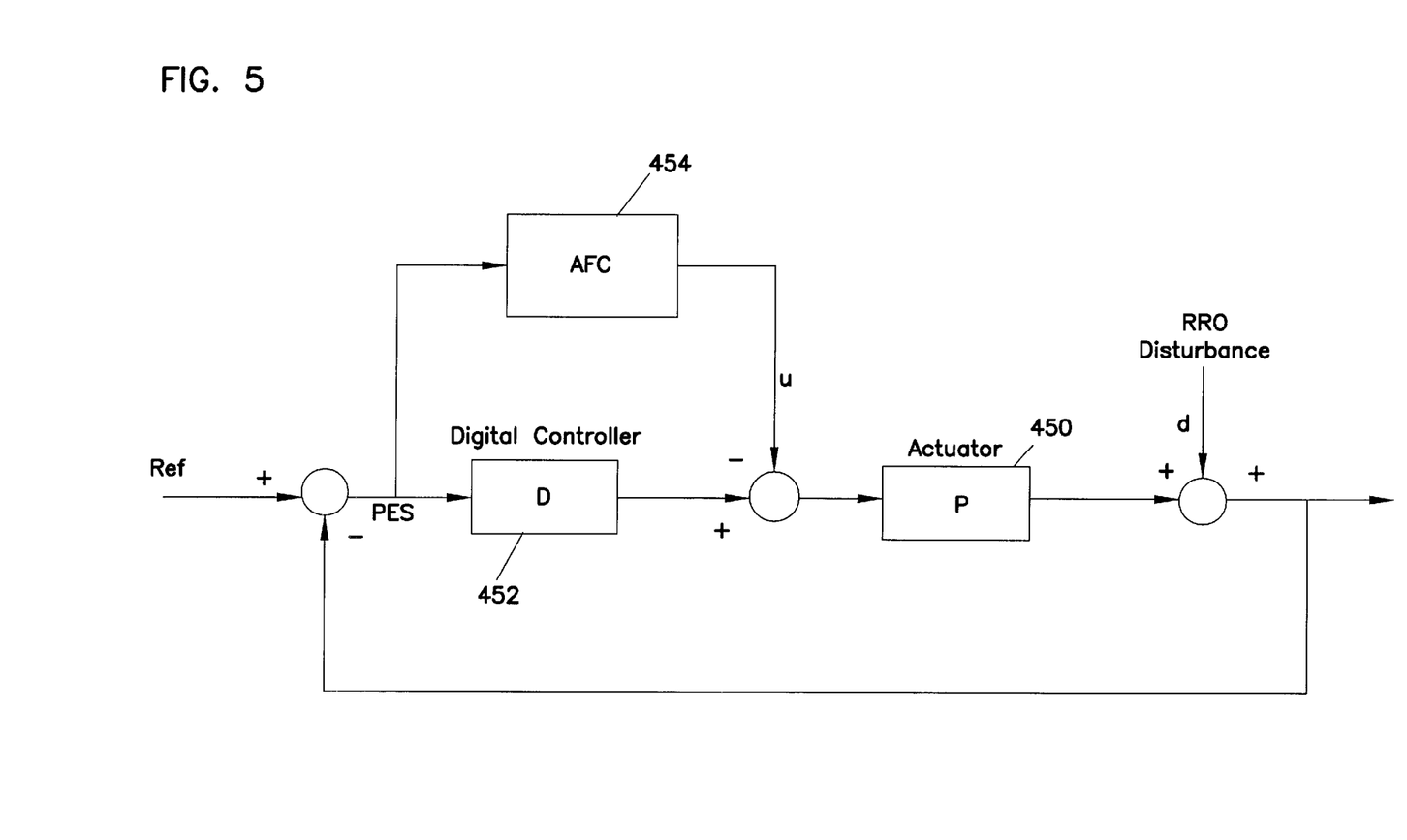
FIG. 5 is a simplified block diagram of a servo loop with adaptive feedforward cancellation.

The servo loop of FIG. 2 may be simplified by combining elements and assigning a single gain to the combined elements. An example of a simplified block diagram is shown in FIG. 5 where an actuator block 450 with a gain of P is shown in place of digital-to-analog component 208, power amplifier 210, head-disc assembly 212 and analog-to-digital converter 214. Controller 204 of FIG. 2 is shown as controller block 452 in FIG. 5 and has a gain of C. The adaptive feedforward cancellation circuit is shown as AFC block 454.

In FIG. 5, the repeatable runout disturbance is shown as a disturbance d that is added to the position information output by actuator 450. The feedforward cancellation signal is shown as U, which is subtracted from the control signal produced by controller 452.

One factor that determines how quickly AFC 450 cancels the repeatable runout is the response of the servo loop to changes in the cancellation signal U. Specifically, since AFC 450 adjusts its cancellation signal based on the position error signal it receives, the degree to which the position error signal changes due to a change in the cancellation signal U will affect the rate at which AFC 450 converges on a cancellation signal. If a small change in the cancellation signal results in a large change in the position error signal, it is generally more difficult for AFC 450 to arrive at a final cancellation signal since the PES will tend to oscillate because of changes in the cancellation signal. Ideally, a change in the cancellation signal results in a similar sized change in the position error signal at all frequencies.

Using FIG. 5, the relationship between the PES signal and the cancellation signal can be determined. In general, this relationship is defined in terms of a transfer function G that is equal to the change in the PES signal over the corresponding change in the cancellation signal. This can be determined from FIG. 5 by setting the reference signal and the repeatable runout signal to zero and tracing the servo loop. Thus, from FIG. 5 it is apparent that:

$$(C(PES)-U)P=-(PES) \qquad \text{EQ. 11}$$

which reorganizes to:

$$\frac{(PES)}{U} = G = \frac{P}{1+CP} \qquad \text{EQ. 12}$$

As mentioned above, ideally this transfer function is equal to one for all frequencies such that a change in the cancellation signal results in an equal change in the position error signal detected by AFC 450. However, in disc drives, this transfer function is rarely if ever equal to one and in many disc drives is highly frequency dependent. As such, the convergence of prior adaptive feedforward cancellation systems is less than ideal.

Figure 6:
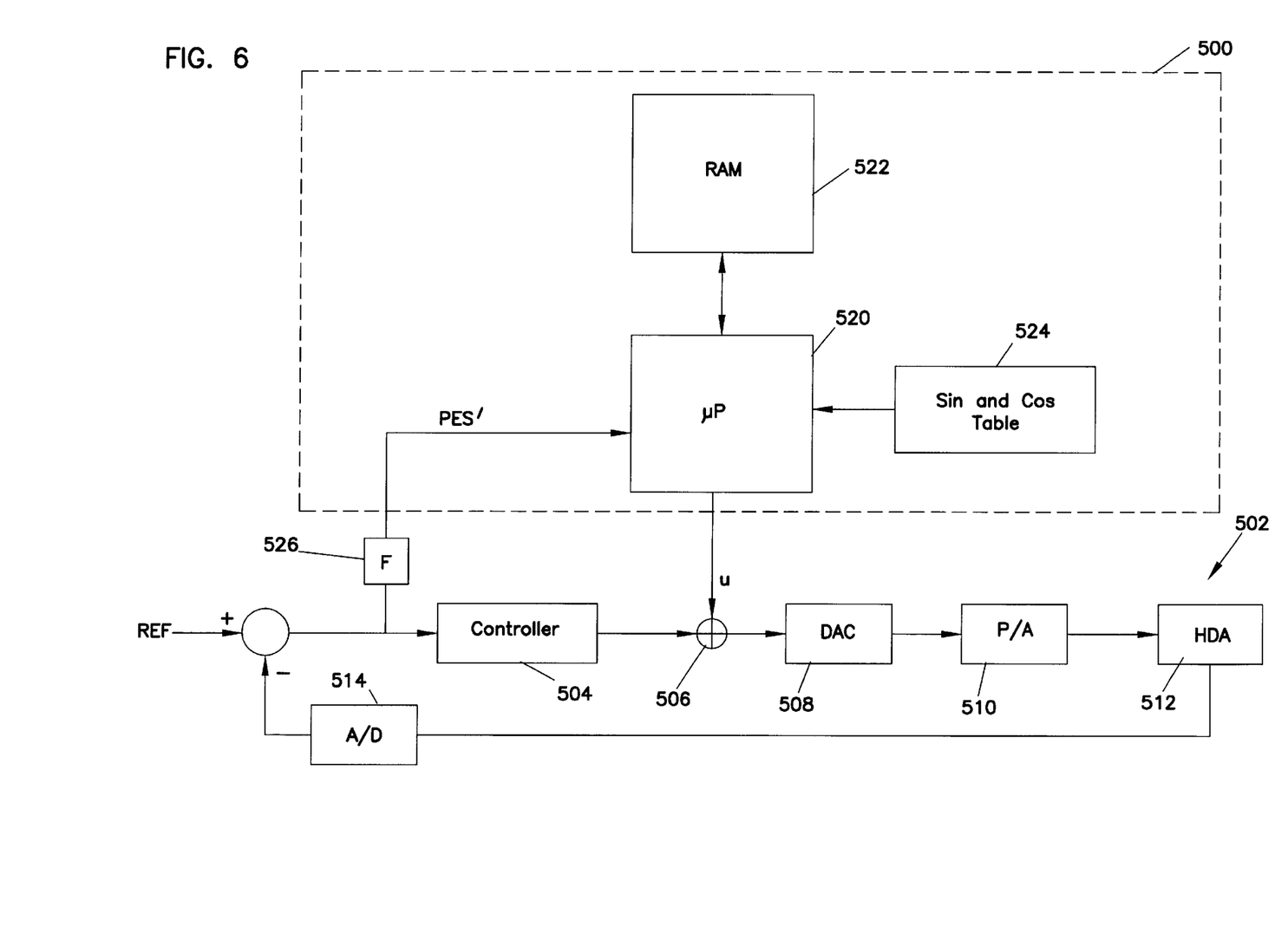
FIG. 6 is a block diagram of a servo loop with an adaptive feedforward cancellation system of the present invention.

To overcome this problem, the present invention introduces a new filter between the returned position error signal and the adaptive feedforward cancellation system. The new filter changes the transfer function so that the transfer function approaches unity. FIG. 6 provides a block diagram of an embodiment of the present invention showing the new filter as filter 526, which has a gain of F.

In FIG. 6, the remainder of the servo loop 502 is similar to that of FIG. 2 and consists of a controller 504, summer 506, digital-to-analog converter 508, power amplifier 510, head-disc assembly 512, and analog-to-digital converter 514. The remainder of the adaptive feedforward cancellation system 500 is also similar to the system of FIG. 2 and includes a microprocessor 520, a Random Access Memory 522 and a sine and cosine table 524.

With the new filter, the transfer function detected by the AFC system becomes:

$$\frac{(PES)'}{U} = \frac{F(PES)}{U} = FG \qquad \text{EQ. 13}$$

where (PES)' is the PES signal provided to the AFC system by filter 526. Using Equation 13, the present invention forces the transfer function detected by the AFC system toward unity at all frequencies by setting the gain of filter 526 to the inverse of the transfer function G such that:

$$\frac{(PES)'}{U} = FG = \frac{1}{G}G = 1 \qquad \text{EQ. 14}$$

The present invention thereby improves the convergence of the AFC system.

Figure 7:
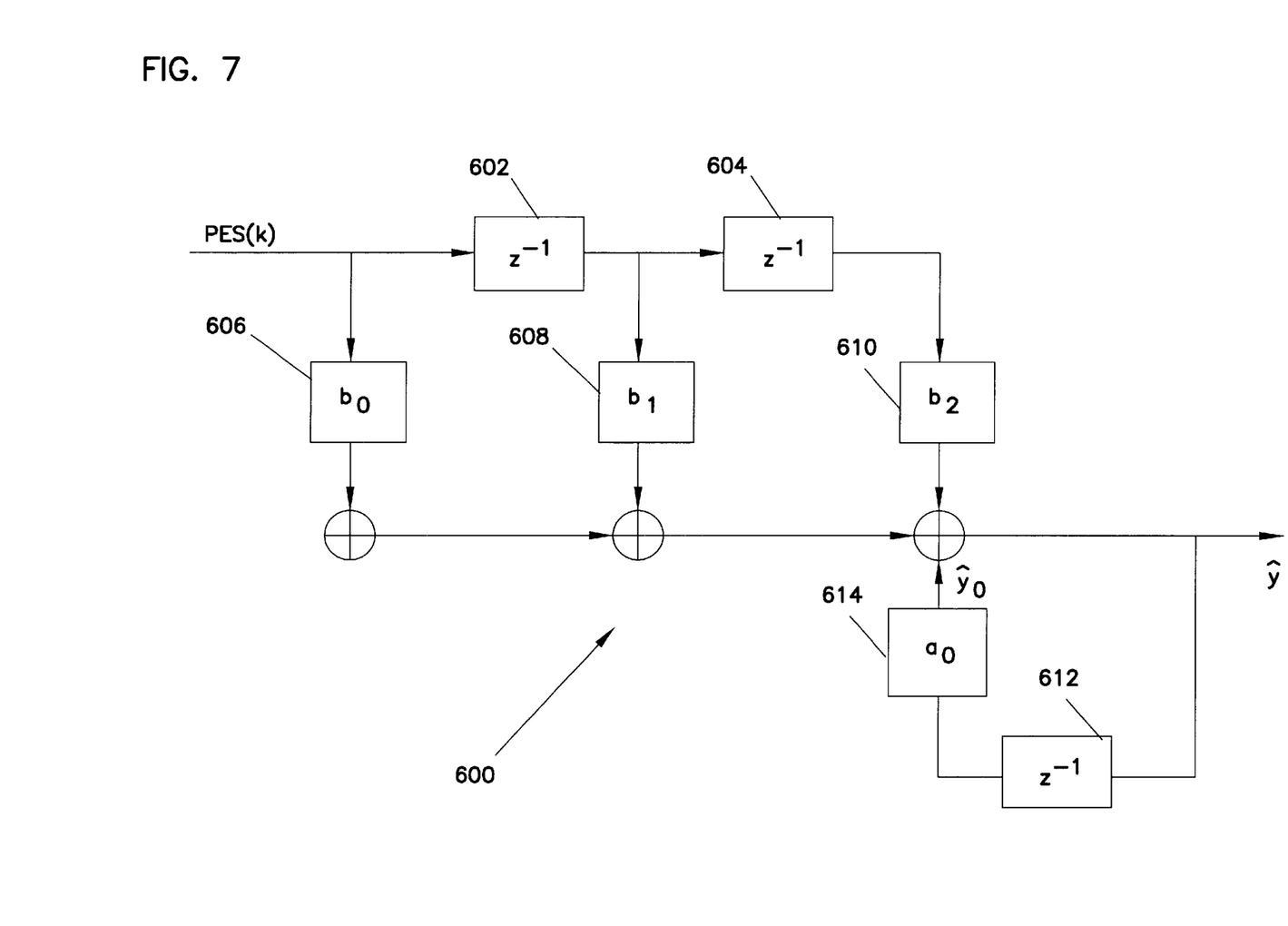
FIG. 7 is a block diagram of the filter of FIG. 6.

Under one embodiment of the invention, filter 526 is realized as third order filter 600 of FIG. 7. Filter 600 includes two delay units 602 and 604 that delay the PES values by one sector each and three weighting blocks 606 ($b_0$), 608 ($b_1$), and 610 ($b_2$) that weight the contributions of the current PES value, the preceding PES value and the second preceding PES value, respectively. The outputs of the weighting blocks are summed together with a delayed and weighted version of the previous filter output $\hat{y}_0$ produced by a delay unit 612 and a weighting block 614 ($a_0$). The resulting output of the filter is shown as y and is defined as:

$$\hat{y}=b_0 PES(k)+b_1 PES(k-1)+b_2 PES(k-2)+a_0 \hat{y}_0 \qquad \text{EQ. 15}$$

where PES(k) is the position error signal for the current sector k.

Those skilled in the art will recognize that filter 600 may be implemented in programmable hardware or software.

Figure 8:
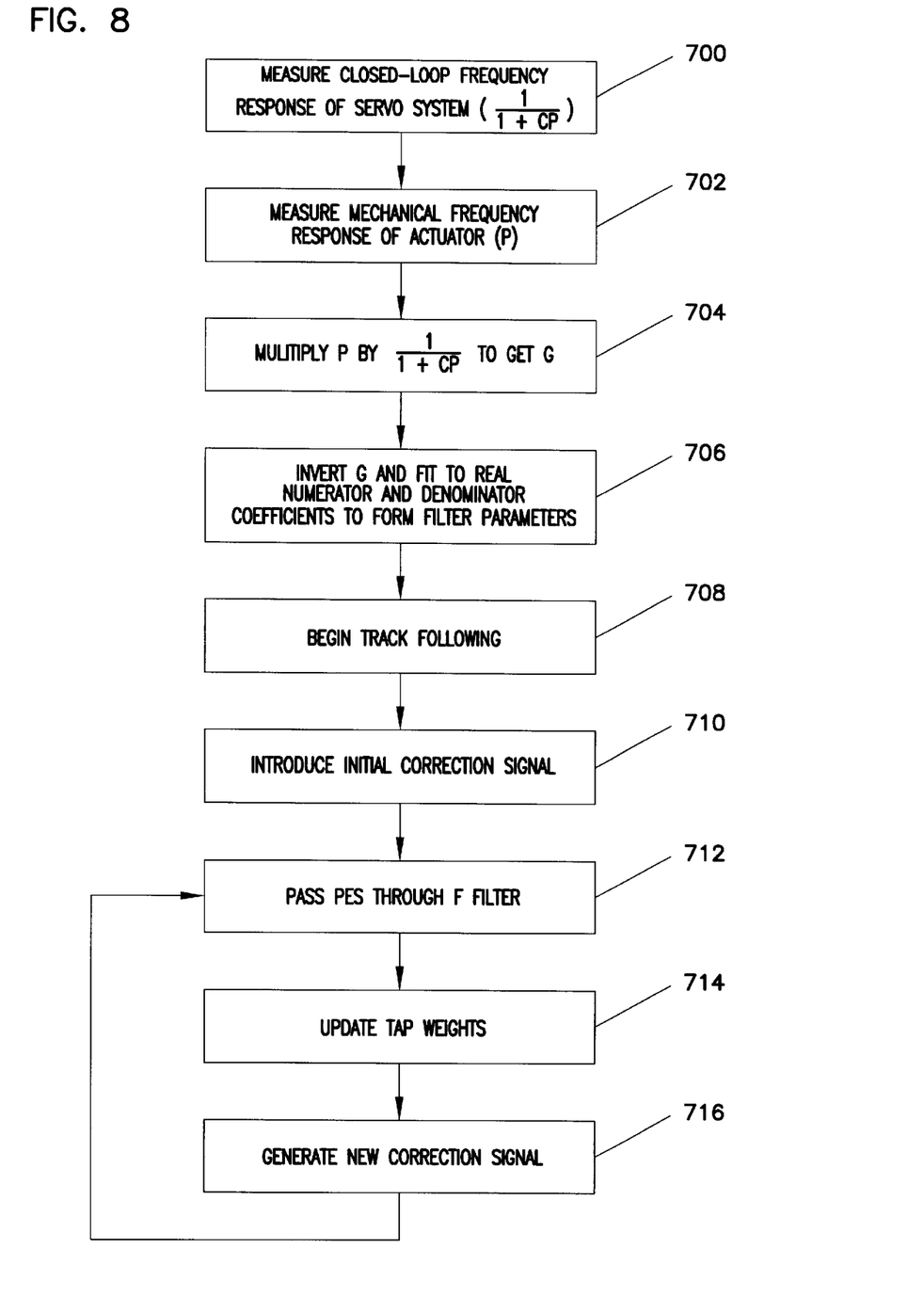
FIG. 8 is a flow diagram of a method of adaptive feedforward cancellation under the present invention.

FIG. 8 provides a flow diagram for practicing one embodiment of the present invention. The process of FIG. 8 begins at step 700 where the closed-loop frequency response of the servo system is determined. There are many known techniques for determining the closed-loop response including introducing signals of various frequencies at the input and measuring the resulting position error signals. Using the simplified diagram of FIG. 5, this measurement provides a response represented by (1/1+CP).

At step 702 of FIG. 8, the mechanical frequency response of the actuator (P) is measured. This can be done by modeling the actuator or by applying control signals of various frequencies to the actuator and measuring the resulting error signals produced by the head.

At step 704 the frequency response of the actuator (P) is combined with the closed-loop response of the servo system to produce the transfer function G such that:

$$G = P \cdot \frac{1}{1+CP} \qquad \text{EQ. 16}$$

At step 706, the transfer function G is inverted and fit to real numerator and denominator coefficients to form the filter parameters ($b_0$, $b_1$, $b_2$, and $a_0$) of filter F. This can be achieved using control software such as MATLAB (available from Mathworks, Inc. of Natick, Mass.). Specifically, the 'invfreqz' function of MATLAB may be used.

In most embodiments, steps 700 through 706 are only performed once for each disc drive and thereafter the filter remains fixed.

Once the filter has been produced, track following can begin at step 708. As the head passes a servo index, an initial cancellation signal is produced at step 710 that has the form:

$$U(k+1) = \sum_{i=1}^{m} W_{i,k+1}^{cos} \cos[i(k+1)(2\pi/N)] + \sum_{i=1}^{m} W_{i,k+1}^{sin} \sin[i(k+1)(2\pi/N)] \quad \text{EQ. 17}$$

where i represents the harmonic of the fundamental sector frequency, m is the total number of harmonics of interest, and $W_{i,k+1}^{cos}$ and $W_{i,k+1}^{sin}$ are harmonic specific adaptive tap weights that are initially set to zero.

At step 712, the position error signal produced for the first current sector (k) is passed through the F filter (526 in FIG. 6, 600 in FIG. 7) to produce a filtered PES value ŷ. This value is then used at step 714 to update the tap weights for the next sector (k+1) for all harmonics using the equations:

$$W_{i,k+1}^{cos} = W_{i,k}^{cos} + \mu \hat{y} \cos[i(k-1)(2\pi/N)] \quad \text{EQ. 18}$$

$$W_{i,k+1}^{sin} = W_{i,k}^{sin} + \mu \hat{y} \sin[i(k-1)(2\pi/N)] \quad \text{EQ. 19}$$

where $W_{i,k+1}^{cos}$ and $W_{i,k+1}^{sin}$ are the tap weights for the next sector k+1 and the ith harmonic, and $W_{i,k}^{cos}$ and $W_{i,k}^{sin}$ are the tap weights for the current sector (k) and the ith harmonic, and p is a learning rate. Under some embodiments, the learning rate is adaptive such that it generally decreases with each sector.

Once the tap weights have been determined at step 714, equation 17 above is used to generate a new cancellation signal at step 716. This new cancellation signal is then applied at the next sector and the process returns to step 712 where the next sector becomes the current sector.

FIGS. 9, 10, 11 and 12 are graphs showing the improved performance of the present invention over the prior art. These graphs were generated by a simulation based on a disc containing 120 sectors per track rotating at 75 Hz.

Figure 9:
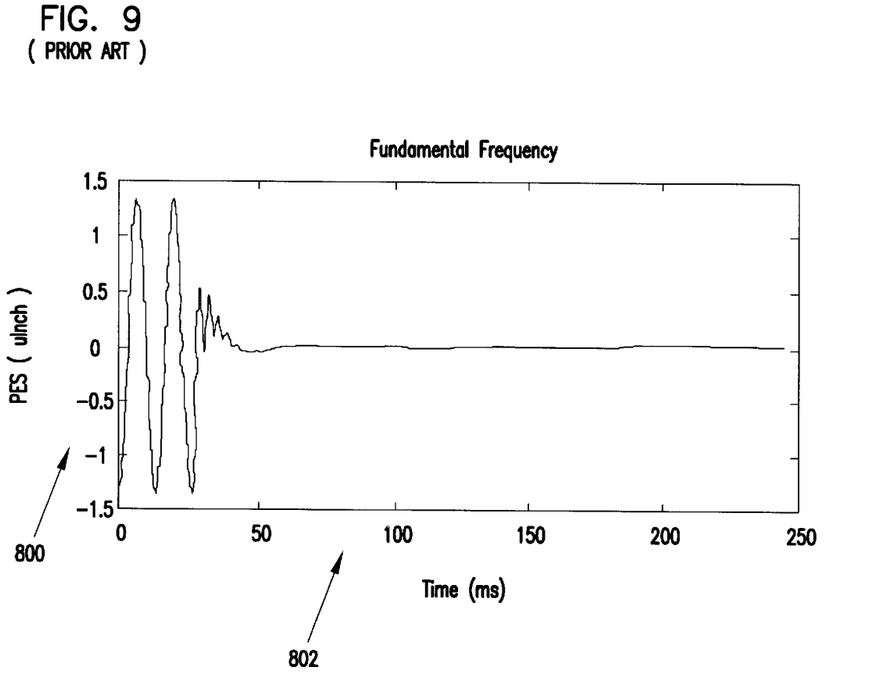
FIG. 9 is a graph of a position error signal at the fundamental frequency using the cancellation techniques of the prior art.
Figure 10:
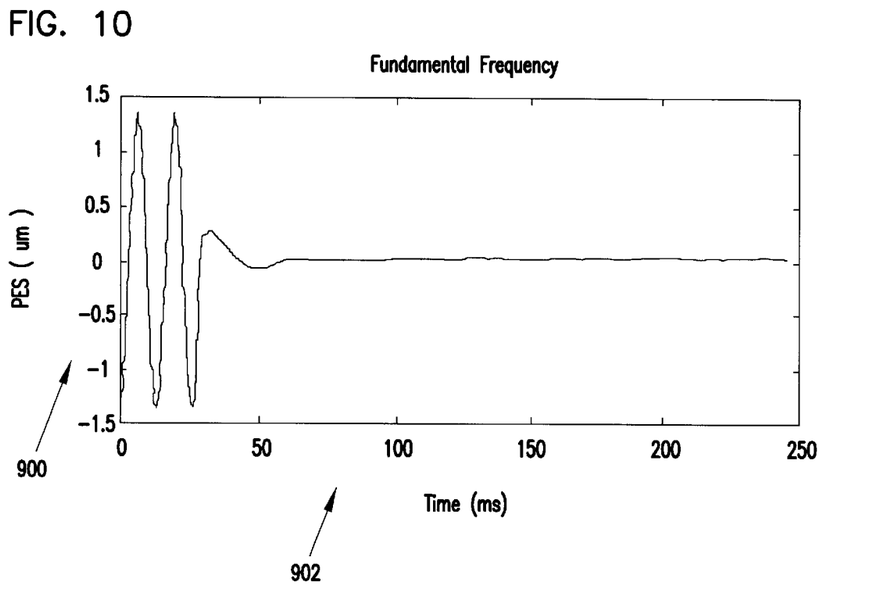
FIG. 10 is a graph of a position error signal at the fundamental frequency using the cancellation techniques of the present invention.

FIGS. 9 and 10 show the effects of cancellation signals generated under the prior art and the present invention, respectively. Equation 17 was used to generate the cancellation signal in both cases. However, the tap weights were updated differently. Specifically, under the prior art technique, the position error signal was used directly in equations 18 and 19 in place of the filtered position error signal, ŷ, of the present invention. FIGS. 9 and 10 do not depict the effects on all frequencies of the position error signal but instead only show the effects on the portion of the position error signal at the fundamental frequency. In FIGS. 9 and 10, the position error signal is shown along vertical axes 800 and 900, respectively and time is shown along horizontal axes 802 and 902. To achieve these results, a learning rate, μ, of 0.01 was used for the prior art and a learning rate of 0.1 was used for the present invention. The learning rate of 0.01 for the prior art was limited by the need for convergence.

As can be seen from FIGS. 9 and 10, the prior art and the present invention cancel the fundamental frequency component in about the same amount of time.

Figure 11:
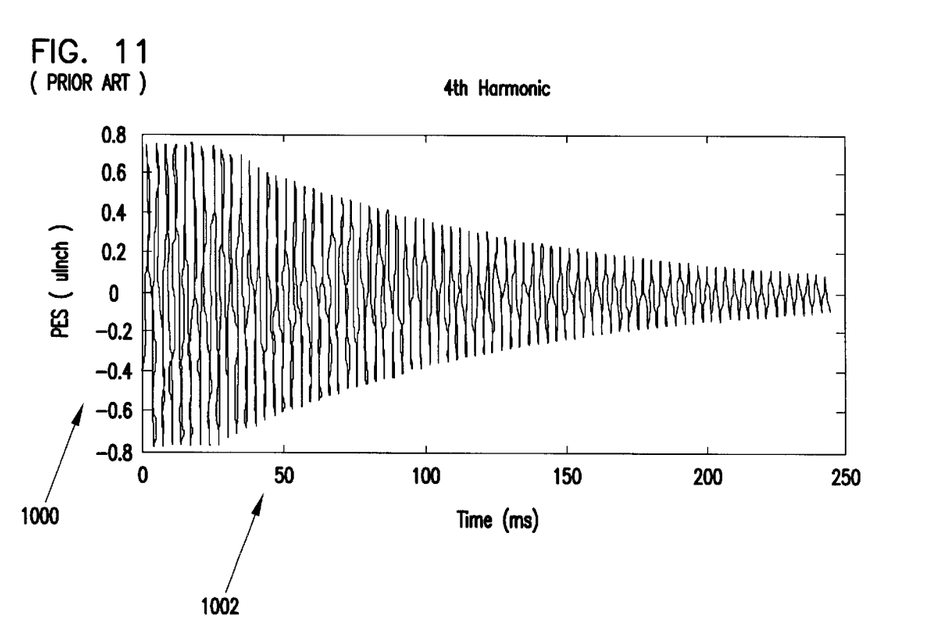
FIG. 11 is a graph of a position error signal at the fourth harmonic frequency using the cancellation techniques of the prior art.
Figure 12:
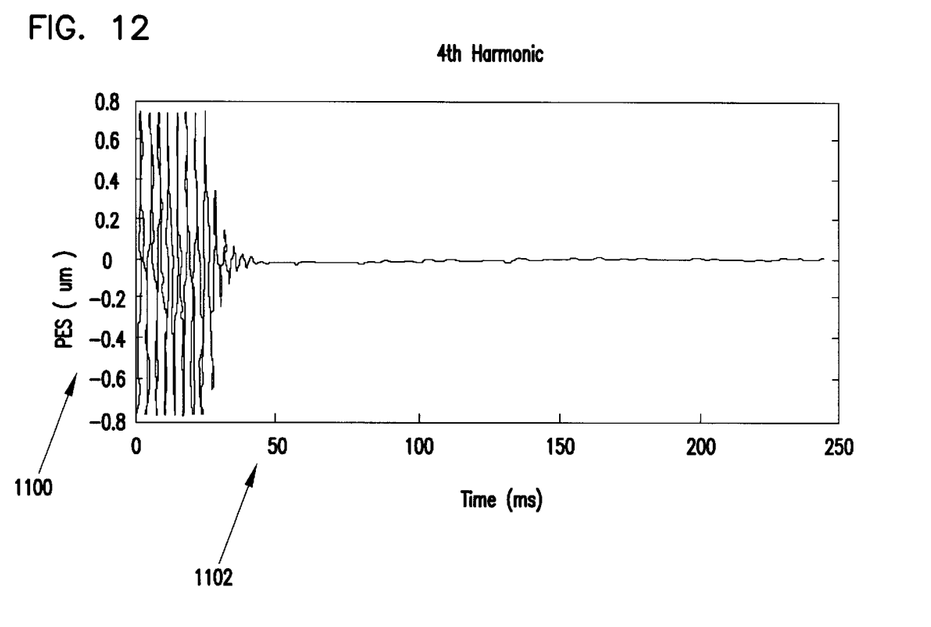
FIG. 12 is a graph of a position error signal at the fourth harmonic frequency using the cancellation techniques of the present invention.

FIGS. 11 and 12 show the cancellation effects of the prior art and present invention, respectively, with regard to the fourth harmonic of the position error signal. In FIGS. 11 and 12, the position error signal is shown along vertical axes 1000 and 1100 and time is shown along horizontal axes 1002, and 1102. To avoid instability, the prior art learning rate was limited to 0.001. However, as shown by FIG. 11, even at this maximum learning rate, the prior art is unable to fully cancel the fourth harmonic of the position error signal. In contrast, under the present invention, the same learning rate of 0.1 that was used for the fundamental frequency is used for the fourth harmonic. This results in a cancellation of the fourth harmonic in about the same amount of time that was required to cancel the fundamental frequency component using the present invention. Thus, the present invention improves the cancellation of higher frequency components of the reapatable runout and cancels all of the frequency components in about the same amount of time. Under one embodiment, all of the frequency components were nearly reduced to null within one revolution of the disc.

In summary, a method is provided for generating an adaptive feedforward cancellation signal, U, for a next sector 304 of a disc 300 in a disc drive 100. The cancellation signal includes at least one tap weight, $W_{i,k+1}^{cos}$, multiplied by at least one trigonometric function, cos[i(k+1)(2π/N)]. The method of generating the cancellation signal includes determining a servo loop transfer function, G, relative to a feedforward cancellation component 454 and inverting the transfer function to form filter parameters. A position error value is then measured at a current sector, k, and the position error value is passed through a filter 526 to create a filtered position error value. A tap weight, $W_{i,k+1}^{cos}$, for the next sector is then determined based in part on the filtered position error value and a tap weight, $W_{i,k}^{cos}$, for the current sector.

A servo system for a disc drive 100 is also provided that includes a controller 504 for generating a control signal and an actuator-head assembly 508, 510, 512, and 514 that is capable of moving the head based at least in part on the control signal. The actuator-head assembly is also capable of generating the position error signal based on the position of the head over a track 322. An adaptive feedforward cancellation component 500 receives a filtered position error signal from a filter 526 and is capable of producing a cancellation signal for a next sector based in part on the filtered position error signal. The transfer function of filter 526 approaches the inverse of the transfer function from the output, U, of the adaptive feedforward cancellation component 500 to the input of the filter 526.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the cancellation signal may be inserted at different locations within the servo loop, thereby changing the calculation of the transfer function and the parameters of the filter without departing from the scope and spirit of the present invention. Other modifications can also be made.

What is claimed is:

1. A method of generating an adaptive feedforward cancellation signal for a next sector of a disc in a disc drive, the cancellation signal comprising at least one tap weight multiplied by at least one trigonometric function, the method comprising steps of:

(a) determining a servo loop transfer function relative to a feedforward cancellation component in the disc drive;

(b) inverting the transfer function to form filter parameters;

(c) measuring a position error value at a current sector;

(d) passing the position error value through a filter formed from the filter parameters to create a filtered position error value; and (e) determining the tap weight for the cancellation signal for the next sector based in part on the filtered position error value and a tap weight for the current sector.

2. The method of claim 1 wherein the servo loop comprises an actuator component having a transfer function of P that is capable of moving a head in response to a control signal and of generating a position error signal based on the position of the head, and wherein the servo loop further comprises a controller having a transfer function of C that is capable of generating a control signal based on a position error signal and wherein the step of determining a servo loop transfer function comprises determining a transfer function of the form $$\frac{P}{1+CP}.$$

3. The method of claim 1 wherein inverting the transfer function to form filter parameters comprises generating filter parameters for a filter function of $\hat{y}=b_0 PES(k)+b_1 PES(k-1)+b_2 PES(k-2)+a_0\hat{y}_0$ where $b_0$, $b_1$, $b_2$, and $a_0$, are the filter parameters, $PES(k)$ is a position error value for a current sector, $PES(k-1)$ is a position error value for a preceding sector, $PES(k-2)$ is a position error value for a second preceding sector, $\hat{y}_0$ is a filter output for a preceding sector and $\hat{y}$ is a filter output for the current sector.

4. The method of claim 1 wherein the cancellation signal is of the form $U(k+1)=W_{k+1}^{cos} \cos[(k+1)(2\pi/N)]+W_{k+1}^{sin} \sin[(k+1)(2\pi/N)]$ with $W_{k+1}^{cos}$ and $W_{k+1}^{sin}$ representing tap weights for the next sector k+1.

5. The method of claim 1 wherein the cancellation signal is of the form $$U(k+1) = \sum_{i=1}^{m} W_{i,k+1}^{cos}\cos[i(k+1)(2\pi/N)] + \sum_{i=1}^{m} W_{i,k+1}^{sin}\sin[i(k+1)(2\pi/N)]$$

with m representing the total number of harmonics of the fundamental sector frequency found in the cancellation signal, and $W_{i,k+1}^{cos}$ and $W_{i,k+1}^{sin}$ representing tap weights for the next sector k+1 and harmonic i.

6. The method of claim 5 wherein determining the transfer function comprises determining the transfer function across a plurality of frequencies and wherein determining the tap weight for the cancellation signal comprises determining separate tap weights for each harmonic of the fundamental frequency.

7. The method of claim 6 wherein determining the tap weights for a harmonic of the fundamental frequency comprises updating the tap weights according to $W_{i,k+1}^{cos}=W_{i,k}^{cos}+\mu\hat{y}\cos[i(k-1)(2\pi/N)]$ and $W_{i,k+1}^{sin}=W_{i,k}^{sin}+\mu\hat{y}\sin[i(k-1)(2\pi/N)]$ where $W_{i,k+1}^{cos}$ and $W_{i,k+1}^{sin}$ represents tap weights for the next sector at harmonic i, $W_{i,k}^{cos}$ and $W_{i,k}^{sin}$ represents tap weights for the current sector at harmonic i, $\mu$ is a learning rate, and $\hat{y}$ is the filtered position error signal for the current sector.

8. In a disc drive, a servo system for positioning a head over a track, the servo system comprising:
   a controller capable of generating a control signal based in part on a position error signal generated by the head;
   an actuator-head assembly comprising an actuator and the head and capable of moving the head based at least in part on the control signal from the controller and capable of generating the position error signal based on the position of the head over a track;
   an adaptive feedforward cancellation component capable of receiving a filtered position error signal for a current sector and capable of producing a cancellation signal for a next sector based in part on the filtered position error signal, the cancellation signal being provided at an output of the cancellation component and comprising at least one tap weight multiplied by at least one trigonometric function; and
   a filter receiving the position error signal at its input and producing the filtered position error signal that is provided to the adaptive feedforward cancellation component, the transfer function of the filter approaching the inverse of the transfer function measured from the output of the adaptive feedforward cancellation component to the input of the filter.

9. The servo system of claim 8 wherein the adaptive feedforward cancellation component produces a cancellation signal of the form $U(k+1)=W_{k+1}^{cos}\cos[(k+1)(2\pi/N)]+W_{k+1}^{sin}\sin[(k+1)(2\pi/N)]$ with $W_{k+1}^{cos}$ and $W_{k+1}^{sin}$ representing tap weights for the next sector k.

10. The servo system of claim 9 wherein the adaptive feedforward cancellation component comprises a tap weight update component for setting tap weights according to $W_{k+1}^{cos}=W_{k}^{cos}+\mu\hat{y}\cos[(k-1)(2\pi/N)]$ and $W_{k+1}^{sin}=W_{k}^{sin}+\mu\hat{y}\sin[(k-1)(2\pi/N)]$ where $W_{k+1}^{cos}$ and $W_{k+1}^{sin}$ represents tap weights for the next sector, $W_{k}^{cos}$ and $W_{k}^{sin}$ represents tap weights for the current sector, $\mu$ is a learning rate, and $\hat{y}$ is the filtered position error signal for the current sector.

11. The servo system of claim 8 wherein the cancellation signal is of the form $$U(k+1) = \sum_{i=1}^{m} W_{i,k+1}^{cos}\cos[i(k+1)(2\pi/N)] + \sum_{i=1}^{m} W_{i,k+1}^{sin}\sin[i(k+1)(2\pi/N)]$$

with m representing the total number of harmonics of the fundamental sector frequency found in the cancellation signal, and $W_{i,k+1}^{cos}$ and $W_{i,k+1}^{sin}$ representing tap weights for the next sector k+1 and harmonic i.

12. The servo system of claim 11 wherein the adaptive feedforward cancellation component comprises a tap weight update component for setting tap weights according to $W_{i,k+1}^{cos}=W_{i,k}^{cos}+\mu\hat{y}\cos[i(k-1)(2\pi/N)]$ and $W_{i,k+1}^{sin}=W_{i,k}^{sin}+\mu\hat{y}\sin[i(k-1)(2\pi/N)]$ where $W_{i,k+1}^{cos}$ and $W_{i,k+1}^{sin}$ represents tap weights for the next sector at harmonic i, $W_{i,k}^{cos}$ and $W_{i,k}^{sin}$ represents tap weights for the current sector at harmonic i, $\mu$ is a learning rate, and $\hat{y}$ is the filtered position error signal for the current sector.

13. The servo system of claim 8 wherein the filter comprises delays and weighting blocks to produce a discrete filter function of the form $\hat{y}=b_0 PES(k)+b_1 PES(k-1)+b_2 PES(k-2)+a_0\hat{y}_0$ where $b_0$, $b_1$, $b_2$, and $a_0$, are filter parameters, $PES(k)$ is a position error value for a current sector, $PES(k-1)$ is a position error value for a preceding sector, $PES(k-2)$ is a position error value for a second preceding sector, $\hat{y}_0$ is a filtered position error value for a preceding sector and $\hat{y}$ is a filtered position error value for the current sector.

14. The servo system of claim 9 wherein the controller has a transfer function of C, the actuator-head assembly has a transfer function of P and the transfer function of the filter approaches $$\frac{1+CP}{P}.$$

15. A disc drive for storing data in tracks along a disc, the disc drive comprising:
   a servo loop for positioning a head relative to a track;
   an adaptive feedforward cancellation component coupled to the servo loop for canceling repeatable runout positioning errors based on a filtered position error signal; and
   a filter capable of filtering a position error signal using a transfer function that is substantially the inverse of a transfer function of a portion of the servo loop to output the filtered position error signal.

* * * * *

UNITED STATES PATENT AND TRADEMARK OFFICE
CERTIFICATE OF CORRECTION

PATENT NO.    : 6,487,035 B1
DATED         : November 26, 2002
INVENTOR(S)   : Liu et al.

It is certified that error appears in the above-identified patent and that said Letters Patent is hereby corrected as shown below:

Column 4,
Line 44, replace Equation 9 with the following:

$$W^{\sin}_{i,k+1} = W^{\sin}_{i,k} + C(k) \cdot PES(k) \cdot X_{i,\sin}(k)$$

Column 9,
Line 45, after " $W^{\cos}_{i,k+1}$ " replace "32" with -- = --.

Signed and Sealed this

Sixth Day of May, 2003

JAMES E. ROGAN
*Director of the United States Patent and Trademark Office*